United States Patent
Ongan et al.

(10) Patent No.: US 11,216,500 B1
(45) Date of Patent: Jan. 4, 2022

(54) PROVISIONING MAILBOX VIEWS

(71) Applicant: Amazon Technologies, Inc., Seattle, WA (US)

(72) Inventors: Murat Ongan, Nootdorp (NL); Matthew E. Goldberg, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/454,768

(22) Filed: Jun. 27, 2019

(51) Int. Cl.
*G06F 3/048* (2013.01)
*G06F 16/338* (2019.01)
*H04L 12/58* (2006.01)
*G06F 9/451* (2018.01)
*G06F 16/33* (2019.01)

(52) U.S. Cl.
CPC ............ *G06F 16/338* (2019.01); *G06F 9/451* (2018.02); *G06F 16/334* (2019.01); *H04L 51/22* (2013.01)

(58) Field of Classification Search
CPC ...... G06F 16/338; G06F 9/451; G06F 16/334; H04L 51/22
See application file for complete search history.

(56) References Cited

U.S. PATENT DOCUMENTS

| | | | | |
|---|---|---|---|---|
| 7,831,676 | B1 * | 11/2010 | Nagar | G06Q 10/107 709/206 |
| 8,713,480 | B2 * | 4/2014 | Flynt | H04M 1/72572 715/847 |
| 9,929,994 | B2 * | 3/2018 | Hamlin | G06N 5/025 |
| 10,192,176 | B2 * | 1/2019 | Kotler | G06Q 10/0631 |
| 10,615,965 | B1 * | 4/2020 | Goldberg | H04L 51/063 |
| 10,757,043 | B2 * | 8/2020 | Gershony | H04L 51/16 |
| 10,880,253 | B2 * | 12/2020 | Woodward | H04L 51/26 |
| 11,075,872 | B2 * | 7/2021 | Gulik | H04L 51/22 |
| 2003/0069892 | A1 * | 4/2003 | Hind | G06F 16/34 |
| 2003/0069900 | A1 * | 4/2003 | Hind | G06Q 10/107 |
| 2006/0242586 | A1 * | 10/2006 | McGlinchey | G06F 16/954 715/747 |
| 2008/0222167 | A1 * | 9/2008 | Hinds | G06F 16/958 |
| 2016/0080304 | A1 * | 3/2016 | Hamlin | G06N 20/00 709/206 |
| 2018/0260782 | A1 * | 9/2018 | Bay | H04L 51/36 |
| 2020/0120050 | A1 * | 4/2020 | Jung | H04L 51/04 |

OTHER PUBLICATIONS

Faithe Wempen, Outlook 2019 for Dummies, Released date: Oct. 2018, Publisher: For Dummies (Year: 2018); Chapter 2, 5, and 6.*

* cited by examiner

*Primary Examiner* — David Phantana-angkool
(74) *Attorney, Agent, or Firm* — BakerHostetler

(57) ABSTRACT

Implementations for providing views of an electronic mail service are described. A user interface may be provided for accessing electronic mail. The user interface may allow users to manage a plurality of mailbox views. A mailbox view may be associated with a set of search criteria for retrieving electronic mails messages associated with an account.

19 Claims, 10 Drawing Sheets

PROVISIONING MAILBOX VIEWS

BACKGROUND

Electronic mail applications allow users to manage messages using folders. This approach to organization is not suitable to handling the large number of messages and complexity of tasks being performed by electronic mail users. Users spend large amounts of time to find relevant messages instead of productively performing tasks. Thus, there is a need for more sophisticated and flexible approaches to organizing electronic mail.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

The disclosed methods and systems may comprise a mailbox views feature that allows for control of a variety of different mailbox views of a user's electronic mailbox. The electronic mailbox may be accessed via a mobile web client, computer, desktop, laptop, tablet, and/or the like. Users may create and save different mailbox views by dynamically applying filters, search keywords, a combination thereof, and/or the like to better organize the user's mailbox. A user interface may be provided to the user that combines a default inbox view, search functionality, and filtering functionality. The user interface may provide a user more control in organizing an electronic mailbox than conventional electronic mailbox applications.

Users who receive many electronic mail messages (emails) may typically create folders and email rules to organize their mailbox. This approach to organization, however, may be limiting. First, one email may only belong to one folder. Second, filters by default may only apply to future emails. Reorganizing what is already in a user's mailbox may involve a lot of manual work without achieving the desired results.

The present disclosure improves over conventional systems at least by allowing users to see email conversations together in new ways, such as a list, a filtered list (e.g., filtered by folders, people, keywords, read status, etc.), and/or the like. An aggregated message count may be provided for each of the filtering options. The aggregated message count may provide a user greater insight into the user's mailbox. The aggregated message count may allow a user to more easily refine the user's search of email messages. This approach may be more powerful than the user interface of traditional e-mail clients that only support exploring the mailbox by folder.

The present disclosure may allow users to create views of the mailbox to organize conversations on-demand. A user can easily switch to a different mailbox view by selecting another mailbox view. A user can create and save different mailbox views, for example, a mailbox view for each project that the user is working on. From each of these mailbox views, organizational criteria (e.g., sub-projects, threads, etc.) can be selected to enable the user to quickly find all electronic mail messages pertaining to the user's current focus. For example, a mailbox view may allow users to view all emails associated with a project (e.g., matter, case). The user interface may identify different identifiers, topics, keywords, users, and/or the like that can be suggested as organizing criteria to further refine the mailbox view. This approach allows users to improve productivity by focusing on what is relevant at a given moment and filtering out the emails that are not relevant. The present disclosure allows for users to more easily access the most relevant emails by creating ad-hoc roles, search terms, filtering features, and/or the like.

Figure 1:
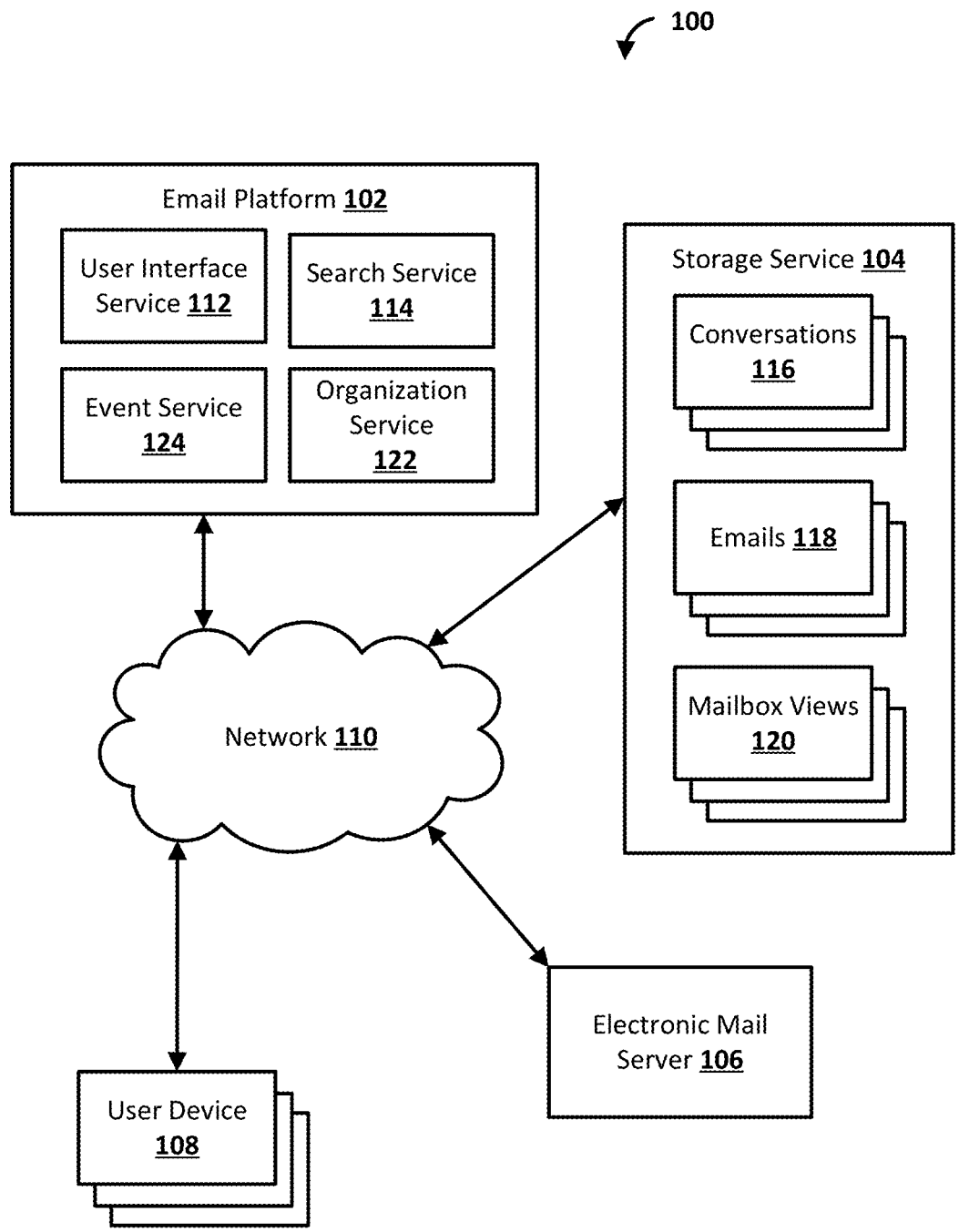
FIG. 1 is a diagram illustrating an example computing system for managing an electronic mail service.

FIG. 1 is a diagram illustrating an example computing system 100 for providing functionality to an application, such as an electronic mail (email) service. The system 100 may comprise an email platform 102 (e.g., or other application platform). The email platform 102 may be configured to provide an email service to a plurality of users. The email service may comprise a web (e.g., or web browser) based email service. The email service may be configured to provide users with email functionality, such as accessing an email account, viewing email messages, organizing email messages in the email account, defining rules for processing emails, drafting email messages, and/or the like. The email service may be configured to access and/or store email messages via a storage service 104. The email service may be configured to communicate with an electronic mail server 106 configured to transmit email messages. The email service may be accessed by users via one or more user devices 108.

The system 100 may comprise a network 110. The network 110 may be configured to communicatively couple one or more of email platform 102, the storage service 104, the electronic mail server 106, the one or more user devices 108, and/or the like. The network 110 may comprise a plurality of network devices, such as routers, switches, access points, switches, hubs, repeaters, modems, gateways, and/or the like. The network 110 may comprise wireless links, wired links, a combination thereof, and/or the like.

The electronic mail server 106 may be configured to route electronic mail messages. The electronic mail server 106 may be external to the email platform 102 (e.g., managed by a separate entity than the entity that manages the email platform 102). The electronic mail server 106 may be comprised in (e.g., integrated into) the email platform 102. The electronic mail server 106 may receive electronic mail messages from the one or more user devices 108, the email platform 102, and/or the like. The electronic mail server 106 may send electronic mail messages to corresponding destination mail addresses. The electronic mail server 106 may determine another electronic mail server associated with the destination mail address and send a received electronic mail message to the determined electronic mail server. The determined electronic mails server may send the electronic mail message to a user device 108 associated with the destination mail address. The email platform 102 may comprise an electronic mail server (not shown). The electronic mail server of the email platform 102 may send and/or receive electronic mail messages addressed to and/or sent from the email platform 102.

The one or more user devices 108 may comprise a computing device, such as mobile device, smart devices (e.g., smart watch, smart glasses, smart phone), a computing station, a laptop, a tablet device, and/or the like. The one or more user devices 108 may be configured to output one or more user interfaces, such as a user interface associated with the email platform 102, an electronic mail user interface, and/or the like.

The email platform 102 may comprise a user interface service 112. The user interface service 112 may provide one or more user interfaces to users associated with the email service (e.g., which may be displayed on the one or more user devices 108). The user interface service 112 may provide interface data for one or more of a web-based email application and/or a mobile email application.

Figure 3:
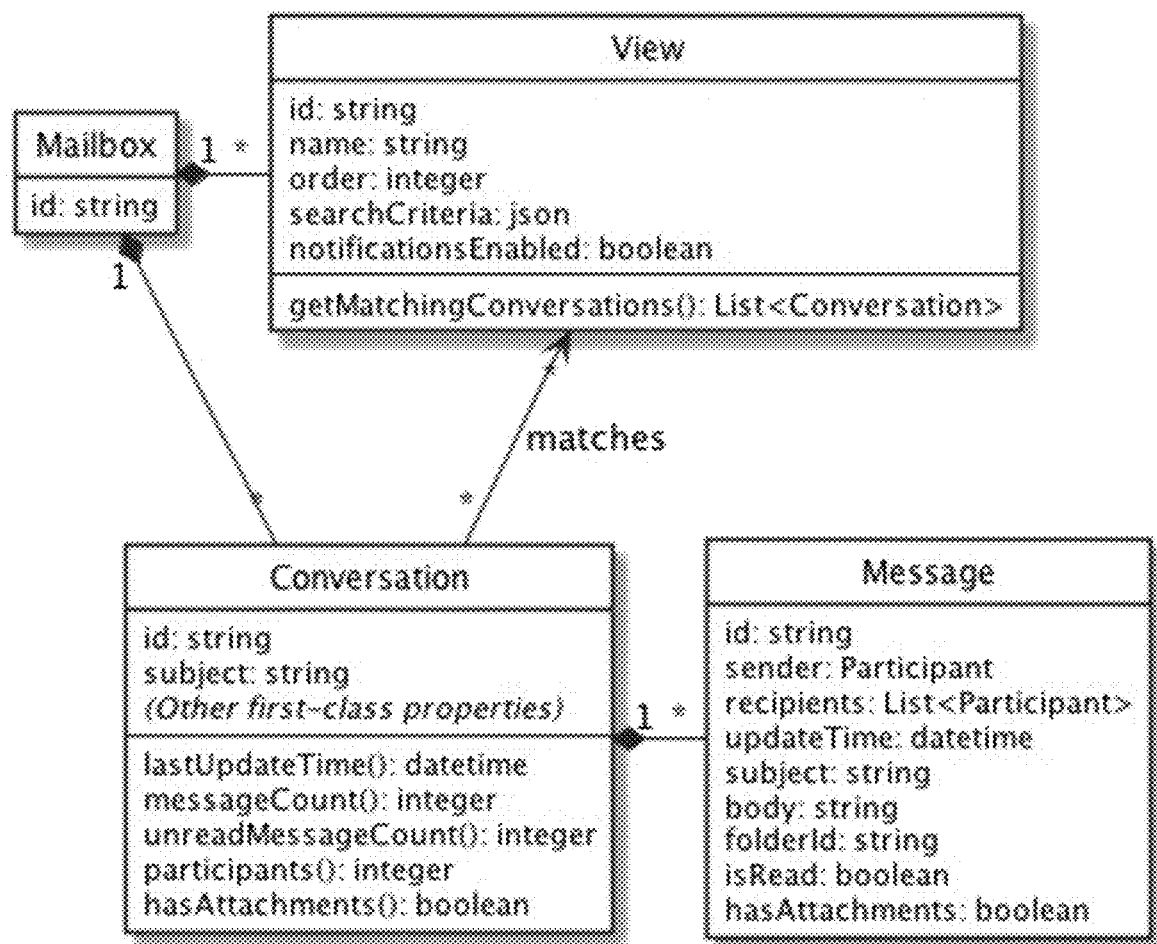
FIG. 3 shows an example data model associated with an email application

The user interface service 112 may be configured to retrieve data for the user interface via search service 114. The search service 114 may be configured to query the storage service 104 based on one or more search criteria. The storage service 104 may comprise one or databases, data stores, data structures, and/or the like. The databases, data stores, data structures, and/or the like may be at one location or may be distributed to devices at various locations. The storage service 104 may be configured to store conversation data 116 associated with the email service. The conversation data 116 may comprise one or more conversations. Each conversation may comprise a data item (e.g., or multiple data items) in the conversation data identifying the conversation. The data item may comprise a subject of the conversation, a time the conversation was last updated, a message count, an unread message count, participants, indication of attachments, a combination thereof and/or the like (e.g., as shown in FIG. 3).

The storage service 104 may comprise email message data 118. The email message data 118 may comprise one or more email messages. Each email message may be associated with a corresponding conversation stored in the conversation data. An email message may be a data item (e.g., or multiple data items) stored in the email message data 118. The data item may comprise an identifier, a sender, one or more recipients, an update time, a subject, a body, a folder identifier, an indication of whether the message is read or unread, an indication of an attachment, a combination thereof and/or the like (e.g., as shown in FIG. 3).

The storage service 104 may comprise mailbox view data 120. The mailbox view data 118 may comprise (e.g., or be indicative of) one or more mailbox views. A mailbox view may be a view of emails (e.g., arrangement of emails, a grouping of emails, set or subset of emails) that is persistent (e.g., stored, persistent between sessions). Each mailbox view may be a data item (e.g., or multiple data items) stored in the mailbox view data 120. The data item may comprise an identifier of the mailbox view, a name of the mailbox view, an order of the mailbox view, one or more search criteria, a notification setting, a combination thereof, and/or the like (e.g., as shown in FIG. 3). The notification setting may allow a user to turn on and off notifications for a view.

The user interface may be configured to access data from the conversations data 116, the email message data 118, the mailbox views data, a combination thereof, and/or the like. The user interface may access the data via the search service 114. The search service 114 may be configured to retrieve mailbox views associated with a user account. The search service 114 may be configured to retrieve conversations and/or email messages associated with the user account. The conversations and/or email messages may be retrieved based on a mailbox view currently output to the user associated with the user account. A conversation and/or email message may be associated with (e.g., match organizing criteria) one mailbox view or multiple mailbox views.

The user interface may output (e.g., display) a mailbox view as a dynamic view of an electronic mailbox. The mailbox view may be updated in response to a user interaction with the mailbox view. The mailbox view may be updated based on events, such as receipt of a new email, determination of a trend, determination of a suggested organizing criteria, and/or the like. Which emails are associated with and/or output as part of a mailbox view may vary over time (e.g., due to events, changes in user behavior, changes in patterns, changes in trends, receipt of new emails). The emails associated with and/or output as part of the mailbox view may vary over time in a single session (e.g., user accesses an application and views mailbox view, during which changes occur). The emails associated with and/or output as part of the mailbox view may vary over time from one session to another.

The user interface may be configured to allow users to select different mailbox views. Example mailbox views may comprise predefined and/or default mailbox views, such as a primary mailbox view (e.g., everything in the inbox folder or in the account). The search service 114 may use search criteria associated with the selected mailbox view to query the storage service 104. The search service 114 may return (e.g., to the user interface service 112 or to a user interface executing on a user device 108) one or more conversations, such as a list of conversations, and corresponding email messages. The search service 114 may return (e.g., to the user interface service 112 or to a user interface executing on a user device 108) a list of email messages (e.g., and identifiers of corresponding conversations).

The email platform 102 may comprise an organization service 122 configured to provide one or more organization criteria. The one or more organization criteria may be output via the user interface as a suggestion (e.g., as selectable suggestion) for further refining the conversations and/or messages returned as part of a mailbox view. The one or more organization criteria may comprise filtering criteria, search criteria, keywords, and/or the like. The one or more organization criteria may comprise additional search terms, a folder name, a participant name (e.g., participant name of a conversation, a recipient name, sender name), keywords determined in the body of messages, and/or the like.

The organization service 122 may be configured to analyze conversations and/or mailbox messages to determine the one or more organizing criteria. The organization service 122 may analyze conversations and/or mailbox messages associated with a specific account. The organization service 122 may analyze conversations and/or mailbox messages of a plurality of accounts, such as a group of accounts (e.g., team, organization, demographically related group), or all accounts of the mailbox service. The organization service may analyze the conversations and/or mailbox messages to identify keywords (e.g., or topics) in the conversations and/or emails messages. The keywords may be identified by using a keyword algorithm to automatically identify keywords. The keyword algorithm may scan text, such as a body of an email message, a subject of an email message, and/or the like. A count and/or frequency of the number of occurrences of each keyword may be determined for one or more time periods. The keywords may be ranked according to the count, frequency, and/or the like. One or more of the keywords (e.g., the keywords having a ranking within a threshold) may be selected as the one or more organizing criteria.

The organization service 122 may be configured to access sender fields of mailbox messages, recipient fields of mailbox messages, participant fields of mailbox messages, and/or the like to determine a list of participants associated with a mailbox view (e.g., or the search results of the mailbox view). The list of participants may be ranked based on a number and/or frequency of occurrence of the participants (e.g., in the search results, in the mailbox generally). One or more participants of the list of the participants (e.g., the participants having a ranking within a threshold) may be selected as the one or more organizing criteria.

The organization service 122 may determine patterns (e.g., or trends), such as patterns in subject line names, patterns in keywords, patterns in participants, patterns in search terms used in one or more mailbox accounts. A single account or a plurality of accounts may be monitored for patterns. The patterns may be time based, such as a pattern in which a first user communicates with second user during a certain time of day. In this case, the first user may receive organizing criteria (e.g., during the same time of day) comprising a suggestion to refine a mailbox view to select only messages associated with the second user. The organization service 122 may track a pattern for a specific mailbox view. If a user typically adds the same search term to further refine the mailbox view, then the search time may be added as an organizing criterion for the mailbox view. The organization service 122 may also send a notification suggesting to add the criterion as a saved search term for the mailbox view.

The organization service 122 may be configured to determine a keyword that is trending (e.g., increasing in popularity/usage within a time period). A trending keyword may be determined by analyzing a set of emails associated with a time period. The set of emails may comprise emails associated with a user account, emails associated with members on a team, emails associated with all users of an email system, emails associated with users who have a threshold amount of communication with a particular user, and/or the like. A trending keyword can be indicated (e.g., emphasized, highlighted) to the user. If the user types the keyword, the keyword may be highlighted (e.g., with an interface element to add as a filtering criteria). If the user receives an email, the keyword may be indicated in the email if the user views the email. If the user interacts with (e.g., hovers over, clicks on) on the keyword (e.g., or indication that keyword is trending), a new mailbox view may be generated or the current mailbox view may be updated to include the keyword as a filtering criteria. Emails that do not contain the keyword may be removed from the new or current mailbox view.

The organization service 122 may be configured to determine a pattern based on an association between a keyword and a user (e.g., or email address indicating a sender or recipient) and/or user role (e.g., manager, team member, supervisor, reviewer). A recurring phrase (e.g., "weekly status update") used in emails may be determined. The phrase may frequently be used with a specific user (e.g., or email address of the user). The phrase may frequently be used with a specific role (e.g., sent typically to users with a specific role or position). If a user enters the phrase (e.g., "weekly status update") in the subject of an email, for example, the organization service 122 may suggest adding the user's manager, supervisor, and/or the like as a recipient to an email based on similar earlier conversations.

Figure 2A:
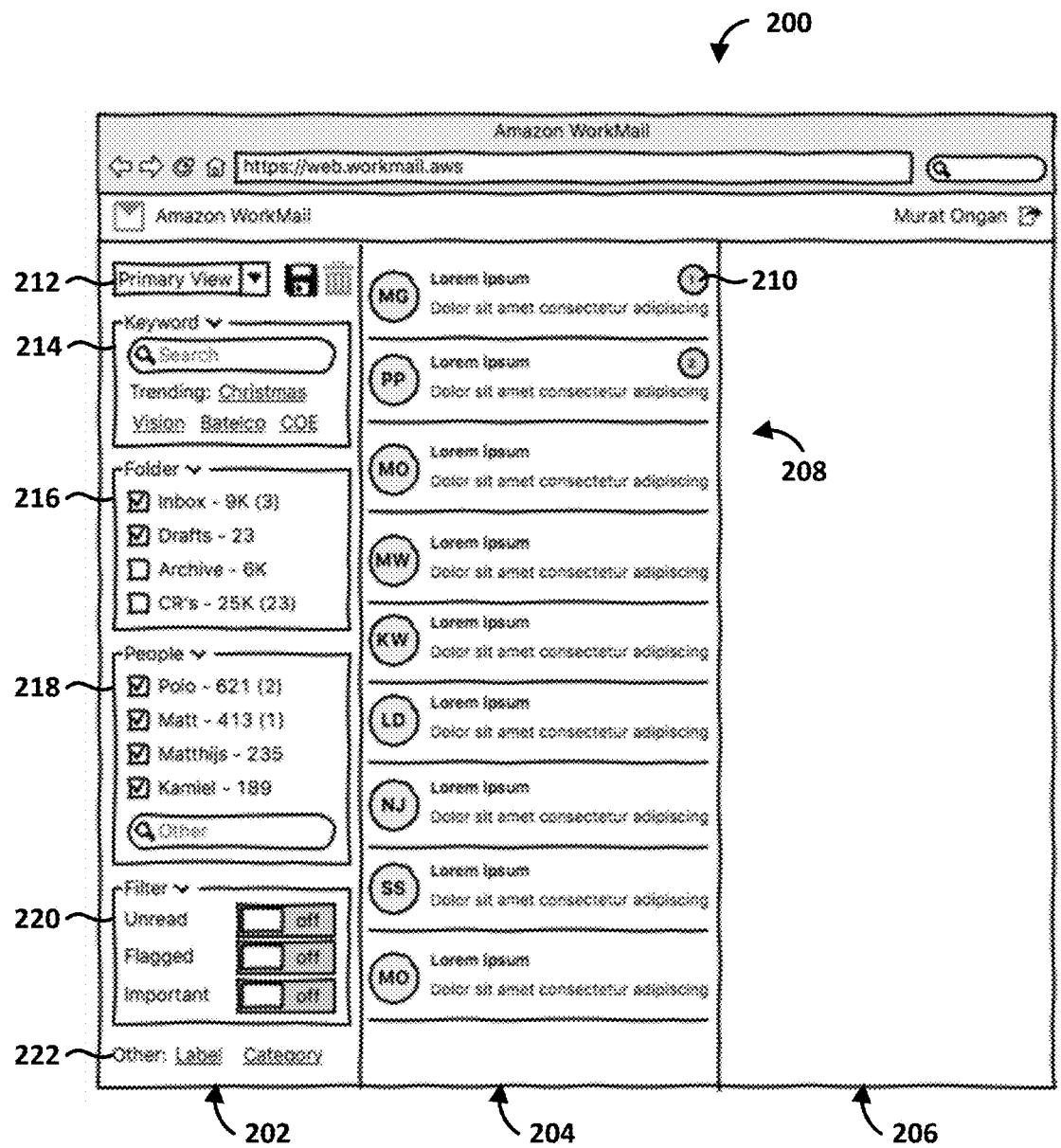
FIG. 2A is a block diagram showing an example user interface of an email application.

The organization service 122 may determine a pattern based on an association of a group of users in one or more emails (e.g., or conversations). If the same group of users appear as recipients in a threshold number of emails and/or conversations, the organization service 122 may determine a pattern indicative of the group. The determined pattern may be used to suggest one or more members of the group in the "People" list (e.g., as shown in FIG. 2A—218). The group itself may be indicated as a selectable criterion for filtering a mailbox view. The determined pattern may be used to suggest to a user to create an e-mail distribution list comprising members of the group. The suggestion may be provided when the user displays an email and/or a conversation that includes members of the group. The determined pattern may be used to suggest to a user to add the users in the group as recipients if one of the people in the group has been added as a recipient to a new e-mail.

The organization service 122 may determine organizing criteria based on a learning algorithm, such as machine learning, artificial intelligence, and/or other statistical modeling techniques. The learning algorithm may track a plurality of data points associated with a single account and/or multiple accounts. The learning algorithm may generate a model, such as a neural network, vector machine, Bayesian network, and/or the like.

The learning algorithm may be configured to ingest a plurality of data points. A data point may comprise data and/or metadata of a sent e-mail, such as participants (e.g., sender, recipients), a subject, a body, a time, a keyword, and/or the like. A co-occurrence matrix may be generated based on the plurality of data points. Groups of people may be identified by generating scores associated with corresponding users (e.g., accounts, email participants). The score may be a score for a pair of users and/or group of users. The scores may comprise pointwise mutual information (PMI) score of pairs of users. Groups may be expanded by applying a chaining rule to calculate the PMI for multiple people. The learning algorithm may use event stream processing and/or complex event processing techniques to determine organizing criteria.

The user interface may receive the one or more organizing criteria as part of a mailbox view. The one or more organizing criteria may be received as metadata associated with a list of conversations and/or email messages retrieved as part of the mailbox view. The one or more organizing criteria may be output via the user interface as selectable interface elements. If the user selects and/or unselects an organizing criterion, the user interface may update the list of conversations and/or email messages accordingly. Updating the list of conversation may comprise querying the search service 114 using the original search criteria of the mailbox view and the additional organizing criteria. In some scenarios, the user interface may filter the list of conversations and/or email messages without querying the search service 114.

The email platform 102 may comprise an event service 124 configured to track events associated with one or more user accounts. The event service 124 may comprise a queue, a stream, and/or the like comprising events (e.g., within a time threshold). The user interface service 112 may access and/or monitor the events and provide updates to the user interface. If the event is receiving a new message, the user interface may update the mailbox view to add the new message and/or associated conversation to the list of conversations and/or messages displayed. The event service 124 may be accessed and/or monitored by the organization service 122. The organization service 122 may count different types of events, identify patterns in the events, apply the events to the learning algorithm to update a model or generate a suggested organizing criterion, a combination thereof, and/or the like.

FIG. 2A is a block diagram showing an example user interface 200 of an email application. The user interface 200 may comprise a web client for accessing a web-based email service. The user interface 200 may comprise one or more of an organizing section 202 (e.g., pane, column), an email list section 204 (e.g., pane, column), an email view section 206 (pane, column). The email view section 206 may provide a view of an email message selected in the email list section 204. The email list section 204 may comprise a list of email messages 208 that is determined, organized, and/or ordered based on information om the organizing section 202. The list of email messages may be organized by conversations. A conversation may comprise one or more emails associated based on a common topic, thread, and/or the like. A conversation may comprise an initial email and any subsequent emails in response to the email (e.g., directly or as a response to another response). A conversation indicator 210 may indicate a number of email messages associated with a particular conversation. The user interface 200 may be configured to sort the list of email messages 208 based on date (e.g., newest to oldest and vice versa), relevancy, and/or the like. If a search keyword is provided, an option may be provided to allow the user to sort by relevance.

The user interface 200 (e.g., the organizing section 202) may comprise one or more organizing criteria associated with filtering, refine, and/or otherwise organizing the list of messages 208, the email account, and/or the like. The user interface 200 (e.g., the organizing section 202) may comprise a view manger 212. The view manager 212 may be configured to allow a user to select, save, delete, and/or the like views. A dropdown box may be used to select any stored mailbox view. A save button (e.g., shown as diskette) may be used to save (e.g., or edit) a mailbox view. A delete button (e.g., shown as a trash can) may be used to delete a mailbox view. A user may create a new mailbox view by editing organizing criteria (e.g., search criteria, filtering criteria) of a mailbox view accessed by the user. The user may save the updated view as a new view by using the save button. The new mailbox view may be saved with a name input by the user. The user may later open this mailbox view to load messages and/or conversations based on the same search criteria, organizing criteria, filtering criteria, settings, and/or like saved for the mailbox view.

The user interface 200 may comprise one or more predefined mailbox views, such as "Primary" view (e.g., default view), "Archive" view (e.g., archived messages), "Sent" view (e.g., sent messages), or "Deleted Items" (e.g., deleted messages), an "All Items" view (e.g., all messages in the account). All users may be provided with the predefined views. The user interface 200 may have a default mailbox view (e.g., "Primary View"). The default mailbox view may comprise a combination of different mailbox views, such as an inbox view (e.g., received messages), a drafts view (e.g., for drafted messages not yet sent), a sent view (e.g., sent messages), and/or the like.

The user interface 200 (e.g., the organizing section 202) may comprise a keyword section 214. The keyword section 214 may comprise a search input for receiving user input of keywords. The user interface 200 may be configured to update the list of email messages 208 based on a keyword input by a user. The keyword section 214 may provide suggested keywords. The suggested keywords may comprise trending keywords. The suggested keywords may be based on trends specific to a user's email, trends specific to a group of email accounts (e.g., a team, organization), trends specific to all user's accounts, trends specific to user's with similar demographics (e.g., location, age), a combination thereof, and/or the like. The suggested keywords may be determined by analyzing email messages currently provided in the list of email messages 208. The suggested keywords may be updated dynamically (e.g., during a single session, or across multiple sessions) in response to changes in the list of messages 208, and or other changes the organizing section 202 (e.g., changes to filtering criteria, selection of a box). The suggested keywords may be updated dynamically (e.g., during a single session, or across multiple sessions) as new email messages are received and added to the list of messages 208. As an example, search keywords may be based on recent conversations and may indicate an event (e.g., Christmas), a subject line (e.g., "vision"), a project name (e.g., "Aardwolf"), and/or the like.

The user interface 200 (e.g., the organizing section 202) may comprise a folder section 216. The folder section 216 may allow a user to select and/or deselect folders. If a user selects a folder, then messages and/or conversations associated with the folder may be shown in the list of messages 208. If a user unselects a folder, then messages and/or conversations associated with the folder may be removed from the list of messages 208. The folders in the folder section 216 may be suggested based on which folders the messages of the list of message are associated with and/or stored in.

The user interface 200 (e.g., the organizing section 202) may comprise a people section 218. The people section 218 may comprise names of people identified in one or more messages associated with a mailbox view. The people section 218 may comprise names of people identified in one or more email messages of the list of email messages 208. The names may be provided to the user interface 202 as metadata associated with a mailbox view, a list of messages 208, or search results. The user interface 200 may be configured to allow the user to unselect a name to filter out email messages associated with the name. The user interface 200 may be configured to allow the user to select a name to show email messages associated with the name. The user interface 200 may be configured to allow a user to input a specific name (e.g., via a search box) to add the name to the names shown in the people section 218. The names may be ordered (e.g., as a list). The names shown by default may comprise only the top X number of names by frequency of occurrence, where X is any predefined number.

The user interface 200 (e.g., the organizing section 202) may comprise a filter section 220. The filter section 220 may comprise one or more filters. The filters may be selected and/or unselected (e.g., by switching them on or off). The filters may be default filters, such as unread messages (e.g., a filter that select/unselects unread messages), flagged messages (e.g., a filter that selects/unselects flagged messages), important messages (e.g., a filter that selects/unselects messages marked as important), and/or the like. The filter section 220 may allow filtering on attributes associated with emails. Each email may have one or more attributes, such as unread/read, flagged/unflagged, important/not important, and/or the like.

The user interface 200 (e.g., the organizing section 202) may comprise an additional option section 220. The additional option section 222 may comprise additional options for organizing email messages, such as by label, category, and/or the like. Selection of one of the other options may result in adding another section (e.g., collapsible section) to the organizing section 202. The user interface 200 may be configured to allow users to assign labels/tags to an email message and/or a conversation. Machine learning may also be applied to assign "smart labels" to messages such as "important", "travel" or "action required." The machine learning may generate and/or refine a model (e.g., based on a training set, based on user feedback rejecting or accepting suggestions). The model may indicate that certain patterns, words, groups of words together, subject lines, timing, participants, and/or other factors may be correlated with corresponding smart labels (e.g., or other suggestions, such as organizing criteria, people, keywords, categories, etc.).

The user interface 200 may be configured to provide visual elements based on metadata, analysis of messages, and/or the like. The visual element may be specific to an organizing criterion. The visual element may be shown in organizing section. The visual element may be dynamically updated (e.g., during a session, from one session to another). The user interface 200 may be configured to provide count information, such as an aggregated count associated with the one or more organizing criteria. The count information may be provided as a visual element (e.g., adjacent to and/or part of an organizing criterion, such as a person, folder, filter, keyword). The count may indicate a number of messages and/or conversations associated with an organizing criterion. The number may comprise an aggregate number (e.g., total number) and/or an unread number. For example, "Inbox—9 k (3)" indicates that around 9,000 messages are in the inbox and 3 of those messages are unread.

Figure 2B:
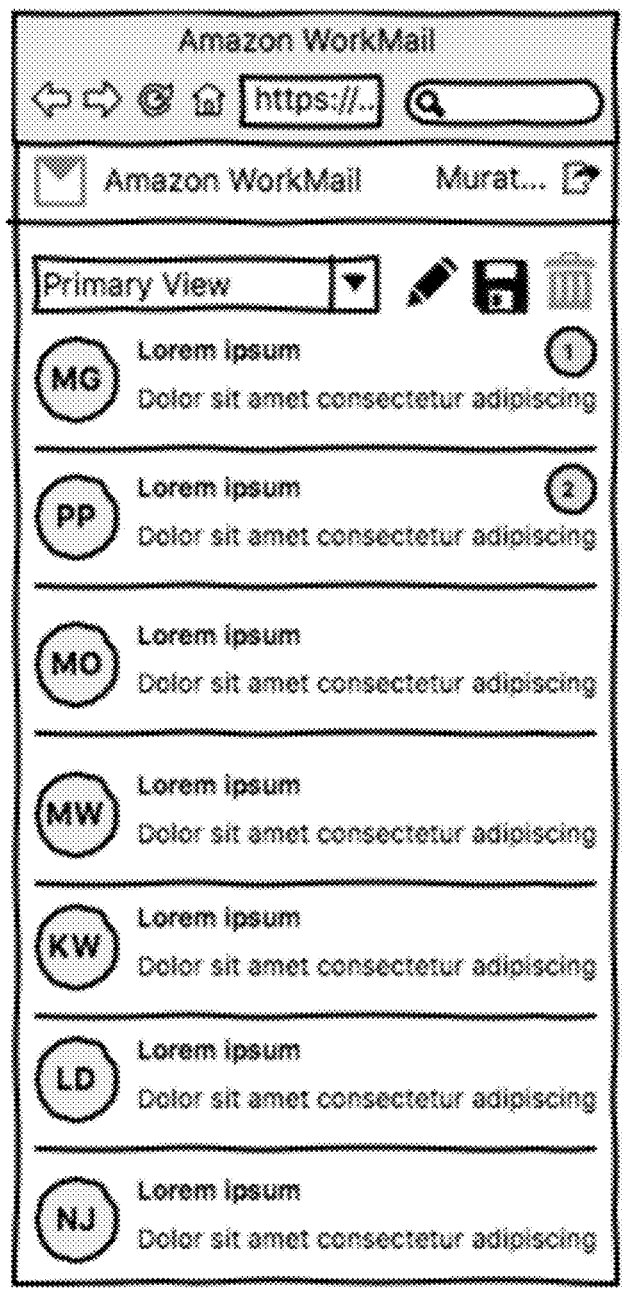
FIG. 2B shows another example user interface associated with a mobile device.

FIG. 2B shows another example user interface 224 associated with mobile device. A mobile device may have a small screen size. The user interface 200 may be rearranged and/or condensed so that a user on a mobile device may be able to access all of the features of the user interface 200 on the user interface 224.

A user may also access a mailbox account, emails, conversations, mailbox views, organizing criteria, and/or the like via an audio interface. The audio interface may allow a user to provide voice commands and/or receive information via audio. The audio interface may comprise a voice assistant, smart assistant, virtual assistant, and/or the like. A user may request (e.g., by voice command) information associated with a mailbox view. The user may say "Alexa, are there any new emails in the [insert name of mailbox view]." The audio interface may respond by indicating a number of unread emails associated with the mailbox view. The audio interface may respond by reading any unread emails associated with the view. The audio interface may also access any additional analysis, metadata, and/or the like associated with the mailbox view. Organizing criteria may be determined and output by the audio interface. The audio interface may respond by saying "Would you like to filter this information based on [insert organizing criteria]."

The user may further filter the information or have the audio interface update the mailbox view by applying one or more organizing criteria. The audio interface may generate a new mailbox view (e.g., or update mailbox view) based on a user's voice commands. The user interface may recognize keywords, filters, participants, message parts (e.g., subject line, body), timing information (e.g., messages before/after X date, ordering information (e.g., order by date, order by count of messages in a conversation). The user may say, "Create a new mailbox view that has participants [insert list of people] and the keyword [insert keyword] in the subject line." The audio interface may cause the new mailbox view to be generated. The audio interface may respond with basic information about the mailbox view, such as number of emails, number of emails today (e.g., or this week), number of unread emails, most active participant, and/or the like.

FIG. 3 shows an example data model associated with an email application. The email application disclosed herein may be configured to access email messages in a data store, such as one or more databases. The data store may comprise a document store configured to support one or more features, such as document nesting, full-text search, sharding, index sorting, secondary indices, and/or the like. The data store may be configured to store e-mail messages grouped as conversations. If a mailbox view is opened in an email application, the data store may be configured to search for matching conversations across multiple shards in the cluster. The data store may be implemented relational databases (e.g., MySQL, PostgreSQL), search engines (e.g., ElasticSearch), document stores (e.g., Mongo DB), a combination thereof, and/or the like.

As shown in FIG. 3, a mailbox account may be associated with and/or comprise one or more conversations. A conversation may be associated with and/or comprise one or more email messages. The mailbox account may be associated with one or more mailbox views. A mailbox view may comprise one or more search criteria. According to the search criteria of a mailbox view, a conversation may or may not match view. A conversation can match any number of views.

Physically, conversations of each mailbox account may be distributed across multiple shards in a search cluster. Each shard may be replicated to multiple nodes for redundancy. Within each shard, the conversations may be sorted first by mailbox id and then by "last update time" of the conversation. This allows listing and filtering conversations of a single mailbox with low latency.

Figure 4:
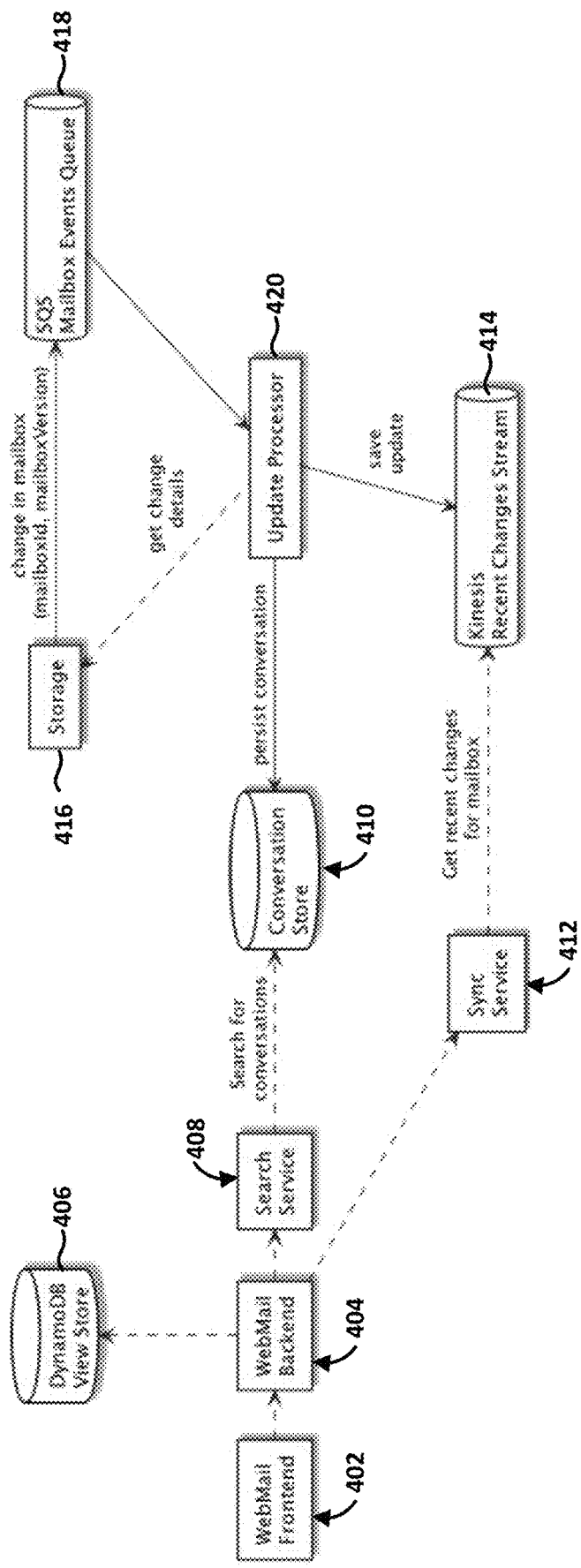
FIG. 4 is a diagram showing components of an example email system.

FIG. 4 is a diagram showing components of an example email system 400. The system 400 may comprise a webmail frontend 402. The webmail frontend 402 may comprise a user interface accessible by a user, such as a web application, a mobile client application, a desktop client application, and/or the like. The system 400 may comprise a webmail backend 404. The webmail backend 404 may be configured to process requests from the webmail backend 404, such as requests for mailbox views, messages, user settings, and/or the like. The webmail backend 404 may be configured to process requests by querying a view store 406. The view store 406 may comprise data indicating a plurality of mailbox views.

The webmail backend 406 may query a search service 408 configured to search for conversations and/or messages associated with conversations. The search service 408 may query a conversation store 410 configured to store conversations and/or messages associated with conversations.

The webmail backend 406 may query a sync service 412 configured to monitor for updates associated with one or more user accounts. The sync service 412 may be configured to access a recent changes stream 414 comprising events associated with one or more user accounts (e.g., within a threshold time period). The sync service 412 may be configured to cause other event, such as user interface events, based on events detected in the recent changes stream 414.

The system 400 may comprise storage 416 associated with one or more mailbox accounts. Updates to the storage 416 may be sent to a mailbox events queue 418. An update processor 420 may be notified of an event in the mailbox events queue 418. The update processor 420 may query the storage 416 to obtain details about the change in a mailbox. The update processor 420 may send update events to the recent changes stream 414.

An example algorithm for finding conversations for a mailbox view is described as follows. Initial matches may be found. If a user loads a mailbox view, conversations may loaded (e.g., by the backend) for the mailbox view using a search service. The search service may execute a query in the data store (e.g., a conversation store) to find conversations and/or email messages that match the search criteria associated with the mailbox view. The query may be executed in one or more shards of the data store. Within each shard, at most n matching conversations may be returned as search results. These search results may be ordered based on date or other criteria. The search results may be ordered by the "last update time" of the conversation. The results of all shards may be merged to find the top n conversations across all shards.

An example sample query may comprise search criteria, such as conversation and/or message properties, keywords, names, and/or the like. An example sample query may comprise the following:
Unread: true
People: Murat Ongan, Matt Goldberg
Keyword: "Team meeting"
Keyword: NOT "Code review"
where unread, people, and keywords are fields with corresponding values to match to the conversations and/or messages.

The data store and/or other search service may return one or more conversations. Each conversation may comprise one or more messages. An example sample may comprise the following:
[{
　id: 123
　lastUpdateTime: 2018-04-27 15:30
　subject: "Meeting Notes"
　messages: [{
　　id: . . .
　　sender: . . .
　　recipients: . . .
　　subject: . . .
　　body: . . .
　},
　. . . ]
},
. . . ]
where the id field is an identifier of a conversation, lastUpdateTime indicates the time a conversation was last updated, the subject indicates the subject associated with a conversation, and the messages field comprises one or more messages. The one or more messages may be identified by the id field and comprise additional data stored in fields, such as a sender field, recipients field, subject field, body field, and/or the like.

Only a portion of all conversations and/or message matching search criteria may be provided to a user. Additional conversations and/or messages may be loaded on demand. Conversations may not be paginated in the traditional sense. Keeping a global offset for a cluster with many shards may be slow and inaccurate. As a user scrolls down a list of results, additional conversations and/or messages may be loaded on demand. The additional conversations and/or messages may be retrieved via the search service.

Figure 5:
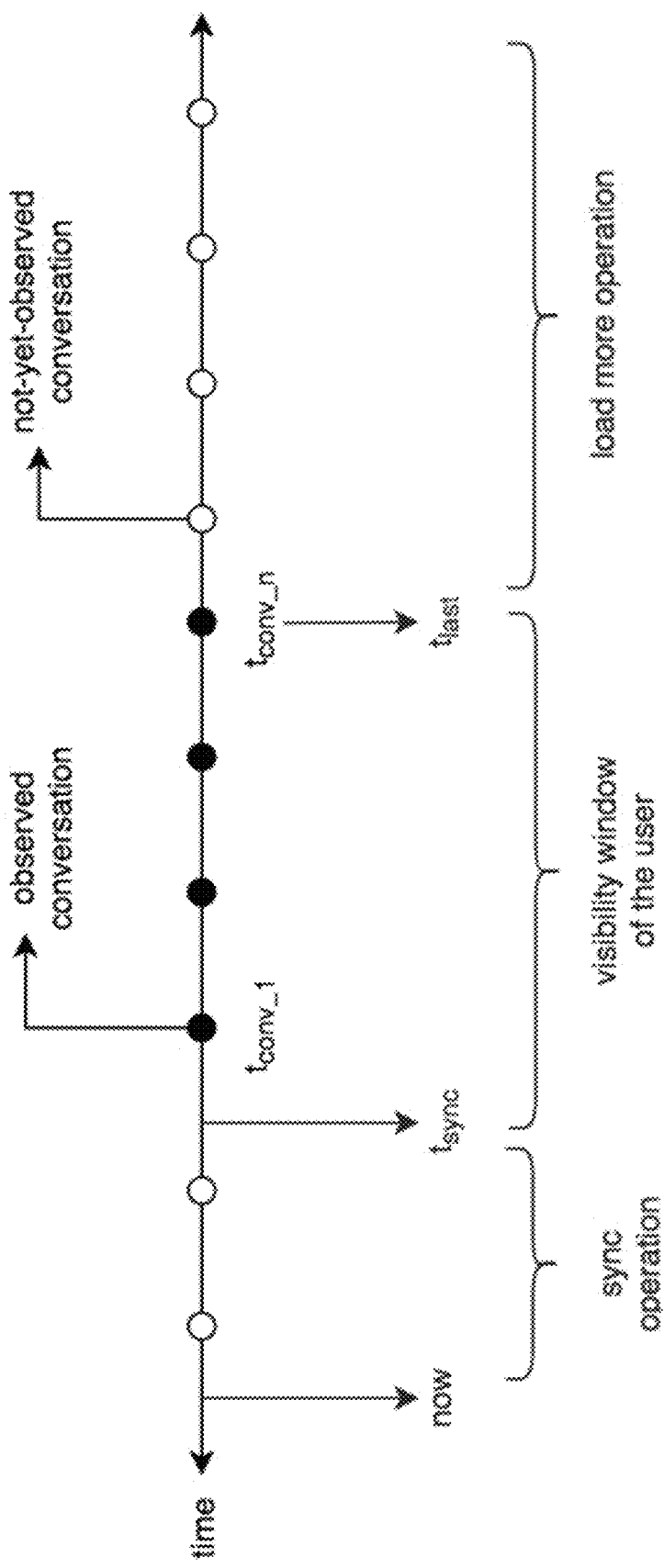
FIG. 5 is a diagram showing synching a user interface with mailbox data.

The conversations and/or messages may be ordered by the last change time (t_conv) of the conversation. At any point in time the user may have a visibility window between the last_sync time (t_sync) and the last change time of the oldest conversation observed (t_last), as shown in FIG. 5.

To retrieve more items, for a mailbox view the search query may be refined to specify items associated with the user's visibility window. For example, the search query may be updated to add "get n more items where t_conv<=t_last" to the search query. After retrieving next group of search results, the visibility window of the user may be extended from (t_sync, t_last) to (t_sync, t_last') where t_last' is older than t_last.

The conversation list and/or message list not be static. The list may change during the user session. If a user scrolls down, the list of conversations may be updated with additional conversations. If a new message is received for a mailbox account, the list of conversations may be updated with the new message and/or new conversation.

The current mailbox view selected by a user may be updated via a syncing process. The user may receive a new email. The current mailbox view can be updated to reflect the updates. The email application may be configured to communicate using a persistent connection, such as a WebSocket connection. The persistent connection may be a connection to a sync service. The sync service may be configured to monitor (e.g., constantly monitor) changes to the mailbox by subscribing to a change stream. Events detected on the change stream may be processed, filtered, and/or translated by the sync service to update a mailbox view (e.g., as the user is using the mailbox view). An example event may comprise a conversation update event, such as receiving a new message associated with a conversation. The sync service may determine, based on a conversation update event, to generate a view update event. The view update event may cause the user interface to update the mailbox view based on the conversation update event. The user interface may add an item to the list of mailbox messages currently displayed via the user interface.

Types of events in the changes stream (e.g., "Recent Changes Stream") may comprise a new conversation created, a message added to the conversation, message deleted from the conversation, a message updated, a conversation metadata updated, a conversation deleted, a combination thereof, and/or the like. Type of events dispatched by the sync service to the client as a result of changes from the change stream may comprise a conversation added to the view, a conversation removed from the view, a message added to the conversation, a message deleted from the conversation, a message updated, a conversation metadata updated, a conversation deleted, a combination thereof, and/or the like.

One or more keywords may be provided with a mailbox view. The mailbox view may display the one or more keywords as suggestions to the user to refine the mailbox view. The one or more keywords may be determined to be trending keywords, such as keywords above a frequency threshold without a subset of the user's emails (e.g., all emails of an account, emails associated with a mailbox view, emails associated with a group of users). The one or more keywords may be selected based on one or more criteria, such as, frequency, freshness/novelty, association with a calendar, and/or the like. For example, a keyword may comprise a name of a new project, plans for an upcoming trip or holiday.

An example algorithm for determining the one or more keywords may comprise the following:

1. Apply the view's search criteria to find matching e-mails.
2. Extract all keywords (e.g., tokens extracted by a full-text analysis engine) from each e-mail
3. Count the number of occurrences of each keyword in matching e-mails
4. Find the subset of e-mails that are sent or received recently (last n days)
5. Count the number of occurrences of each keyword in recent e-mails
6. Calculate "freshness" of each keyword by dividing the frequency in the recent e-mails, by the frequency in all e-mails Using these steps an example data set can be determined, such as the data set shown in Table 1.

TABLE 1

| A<br>Keyword | B<br>Count in all<br>Frequency<br>documents | C<br>Count in<br>in all<br>documents | D<br>Frequency<br>recent<br>documents | E<br>Freshness<br>in recent<br>documents | F<br>Freshness |
|---|---|---|---|---|---|
| k_1 | 100 | 0.10% | 70 | 0.70% | 70% |
| k_2 | 50 | 0.05% | 50 | 0.50% | 100% |
| k_3 | 500 | 0.50% | 100 | 1% | 20% |
| k_4 | 200 | 0.20% | 10 | 0.10% | 5% |
| total | 100000 | 100% | 10000 | 100% | |

Using the data set, a static criteria may be applied to eliminate keywords below a threshold frequency. The remaining keywords may be ordered by descending freshness to choose the top keywords (e.g., which will be provided to the user). The data set may be used to score the keywords based on a variety of criteria, machine learning, and/or the like. A supervised learning algorithm (e.g., such as support vector machines) may be used to find the scores of each keyword and choose the top ones. The machine learning (e.g., supervised learning) algorithm may be trained with a positive signal if the user selects a keyword to further refine the mailbox view.

Figure 6:
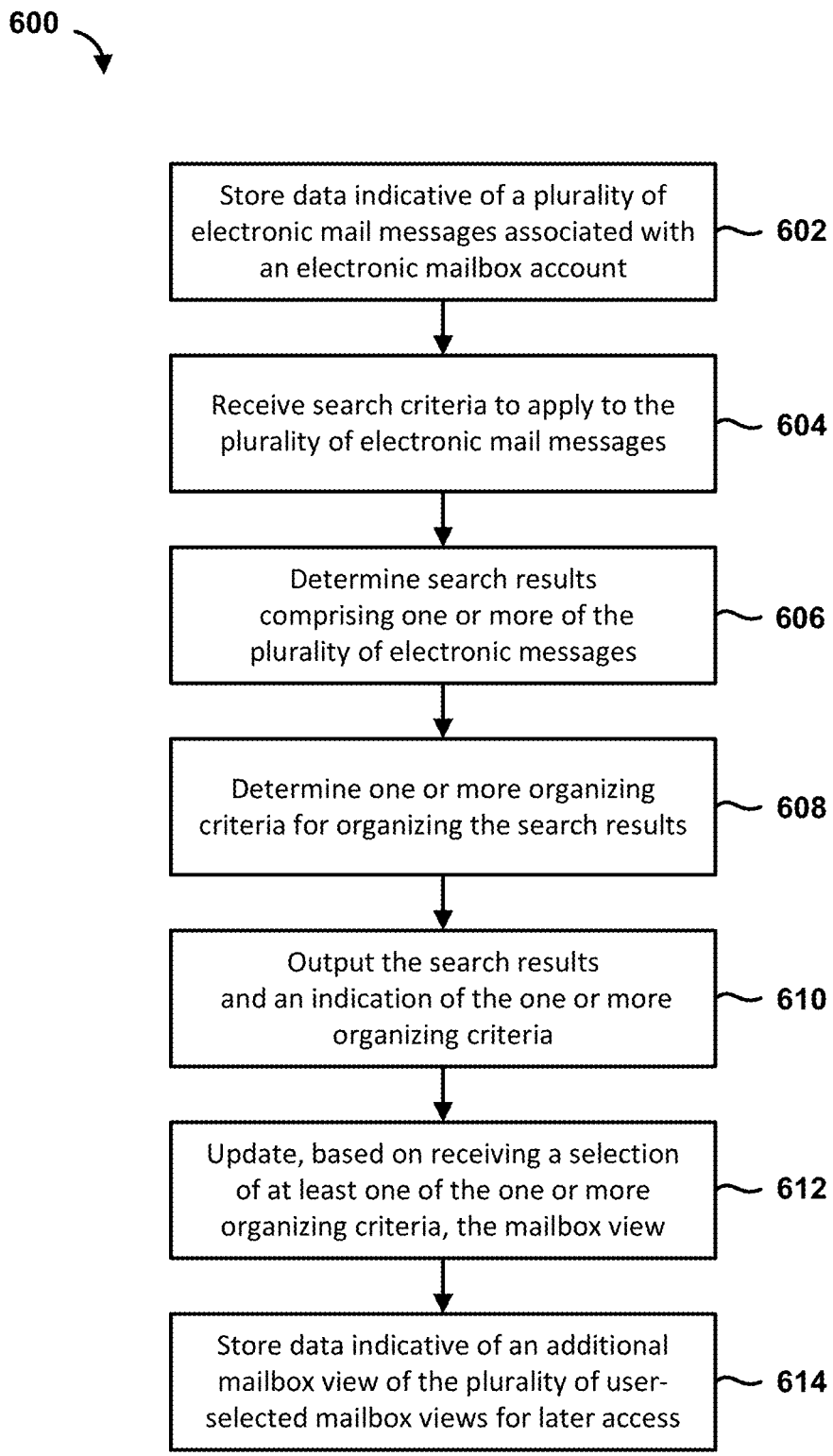
FIG. 6 is a flowchart showing an example method.

FIG. 6 is a flowchart showing an example method 600. The method 600 may comprise a computer implemented method for providing a function as a service to an electronic mail application. A system, such as the system 100 of FIG. 1 may be configured to perform the method 600.

Operation 602 depicts storing data indicative of a plurality of electronic mail messages associated with an electronic mailbox account. Data indicative of a plurality of conversation may be stored. Each conversation may be associated with one or more of the plurality of electronic messages. An electronic mail service, such as a web-based electronic mail service may store the plurality of conversations and/or plurality of electronic mail messages. The plurality of conversations and/or plurality of electronic mail messages may be associated with an account of a user (e.g., email service subscriber).

Operation 604 depicts receiving search criteria to apply to the plurality of electronic mail messages. The search criteria may be received via a user interface of the electronic mail application. The user may input (e.g., into a search bar) the search criteria as one or more search terms. An electronic mail service may send suggested search criteria (e.g., based on the search terms, patterns, trends). The user may select the suggested search criteria.

Operation 606 depicts determining search results comprising one or more of the plurality of electronic messages. The search results may be determined based on the search criteria. One or more data stores (e.g., distributed data partitions) managed by the electronic mail service may be queried to determine the search results. The search results may be organized as conversations comprising corresponding portions of the plurality of electronic messages.

Operation 608 depicts determining one or more organizing criteria for organizing the search results. The one or more organizing criteria may be determined based on counting occurrences of information in the search results. Determining, based on counting occurrences of information in the search results, the one or more organizing criteria for organizing the search results may comprise counting one or more of names identified in search results, keywords in the search results, or values of data fields in the search results.

Determining, based on counting occurrences of information in the search results, one or more organizing criteria for organizing the search results may comprise one or more of: determining one or more keywords in search results, determining a first frequency of the one or more keywords in a first portion of the search results associated with a first time period, determining a second frequency of the one or more keywords in a second portion of the search results associated with a second time period, and determining the organizing criteria by ranking the one or more keywords based on the first frequency and second frequency.

Operation 610 depicts outputting the search results and an indication of the one or more organizing criteria. The search results and the indication of the one or more organizing criteria may be output via the electronic mail application. The search results may be represented as items associated with a mailbox view of a plurality of user-selectable mailbox views. The one or more organizing criteria may be represented as selectable criteria for updating the search results. Outputting the search results may comprise outputting the search results as one or more conversations of the plurality of conversations.

A visual element associated with a first organizing criterion of the one or more organizing criteria may be output (e.g., or caused to be output) as part of operation 610. The visual element may be output adjacent (e.g., at the end of, on the same line) to the first organizing criterion. The visual element may indicate additional information about a set of electronic mail messages matching the first organizing criterion. The additional information may comprise a count of the set of electronic mail messages. The visual element may comprise text (e.g., a number), a color, a graphic (e.g., trending arrow), and/or the like. The additional information may indicate a predicted relevancy, importance, scope (e.g., number of messages, time span of messages), highest ranked keyword in the set of messages, and/or the like.

Operation 612 depicts updating the mailbox view to display updated search results. The mailbox view may be updated based on receiving a selection of at least one of the one or more organizing criteria. The user interface may filter the search results and/or may query the electronic mail service to obtain the updated search results.

Operation 614 depicts storing data indicative of an additional mailbox view of the plurality of user-selected mailbox views for later access. The data indicative of the additional mailbox view may comprise an identifier of the additional mailbox view, the search criteria, and the at least one of the one or more organizing criteria.

Figure 7:
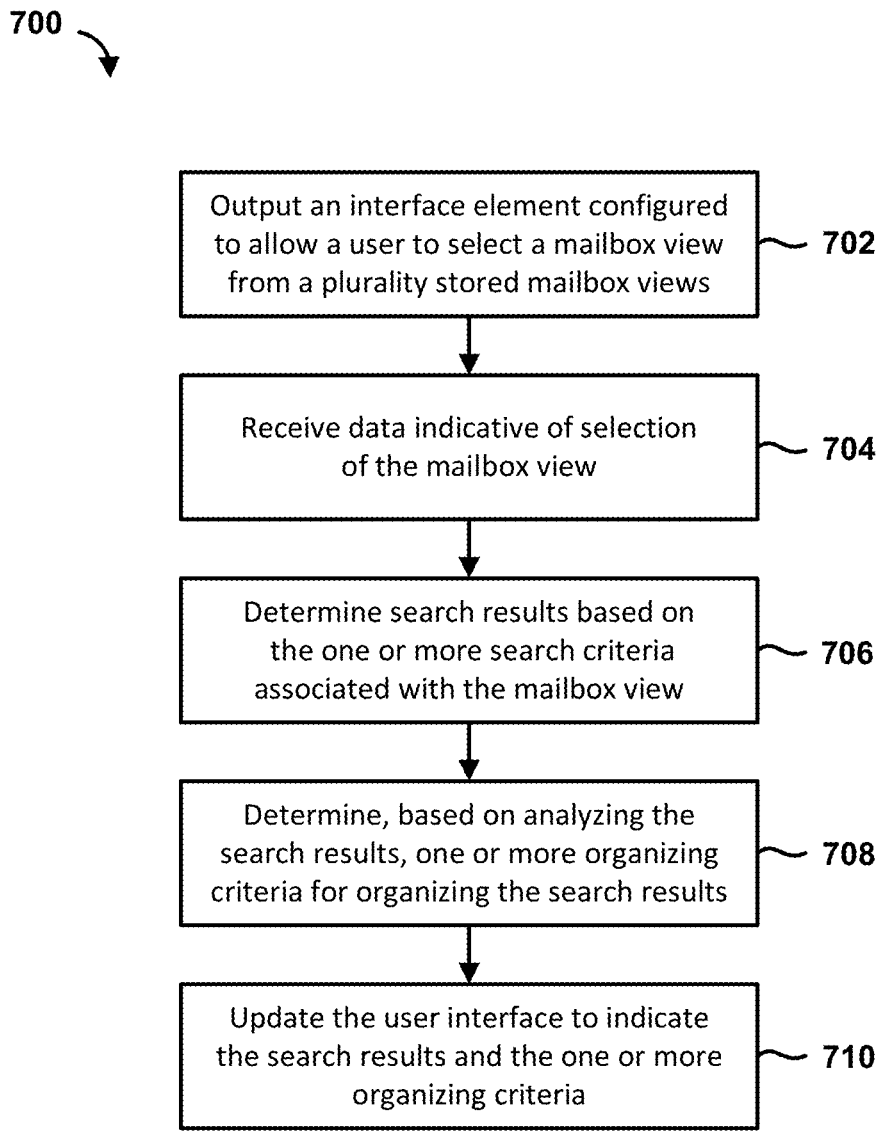
FIG. 7 is a flowchart showing an example method.

FIG. 7 is a flowchart showing an example method 700. The method 700 may comprise a computer implemented method for providing a function as a service to an electronic mail application. A system, such as the system 100 of FIG. 1 may be configured to perform the method 700.

Operation 702 depicts outputting an interface element configured to allow a user to select a mailbox view from a plurality of stored mailbox views. The interface element may be output via a user interface of an electronic mail application. The mailbox view may be associated with one or more search criteria and/or an identifier of the mailbox view. The mailbox view may be dynamically updated (e.g., during a single session, or across multiple sessions) based on changes associated with one or more of a user account or a receipt of a new electronic mail message.

Operation 704 depicts receiving data indicative of selection of the mailbox view. A user may select the mailbox view from a list of a plurality of mailbox views. The user interface may detect an interaction with an interface element indicating the selection of the mailbox view. The user may input a name of the mailbox view.

Operation 706 depicts determining search results based on the one or more search criteria associated with the mailbox view. The search results may be determined based on receiving the data indicative of the selection of the mailbox view. Data indicative of a plurality of conversations and/or electronic mail messages may be stored. Each conversation may be associated with one or more of a plurality of electronic messages. Outputting the search results may comprise outputting the search results as one or more conversations of the plurality of conversations. Outputting the search results may comprise outputting the search results as a plurality of electronic mail messages. The search results may be output as an ordered list. The user interface may only show a portion of the search results. As the user scrolls through the search results, the remaining portion of the search results may be output.

Operation 708 depicts determining one or more organizing criteria for organizing the search results. The one or more organizing criteria may be determined based on analyzing the search results. The organizing criteria may comprise one or more of search criteria, filtering criteria, a name in the search results, or a keyword in the search results. Determining the one or more organizing criteria for organizing the search results may comprise one or more of determining a frequency of keywords in the search results or determining a frequency of keywords in electronic mail messages not included in the search results. Determining the one or more organizing criteria for organizing the search results may comprise counting one or more of names identified in search results, keywords in the search results, or values of data fields in the search results. The one or more organizing criteria may be sent to the user interface as metadata associated with the search results.

A visual element associated with a first organizing criterion of the one or more organizing criteria may be caused to be output via the user interface as part of operation 708. The visual element may be output adjacent (e.g., at the end of, on the same line) to the first organizing criterion. The visual element may comprise an enhancement (e.g., bold, underline, color, change in size, change in font) of the text indicating the first organizing criterion. The visual element may indicate additional information about a set of electronic mail messages matching the first organizing criterion. The additional information may comprise a count of the set of electronic mail messages. The visual element may comprise text (e.g., a number), a color, a graphic (e.g., trending arrow), and/or the like. The additional information may indicate a predicted relevancy, importance, scope (e.g., number of messages, time span of messages), highest ranked keyword in the set of messages, and/or the like.

Operation 710 depicts updating the user interface to indicate the search results and the one or more organizing criteria. The user interface may be updated to show the selected mailbox view. Data indicative of a selection of one of the organizing criteria may be received. The user interface (e.g., or mailbox view) may be updated to reflect applying the organizing criteria to the search results.

An information stream comprising a plurality of events associated with a user account may be accessed. A pattern may be determined based on one or more of the plurality of events. An additional organizing criterion may be determined based on the pattern. The additional organizing criterion may be output with the mailbox view. The user interface may output one or more predefined filters for filtering the search results based on whether an electronic mail message is unread, flagged, or marked as important.

Figure 8:
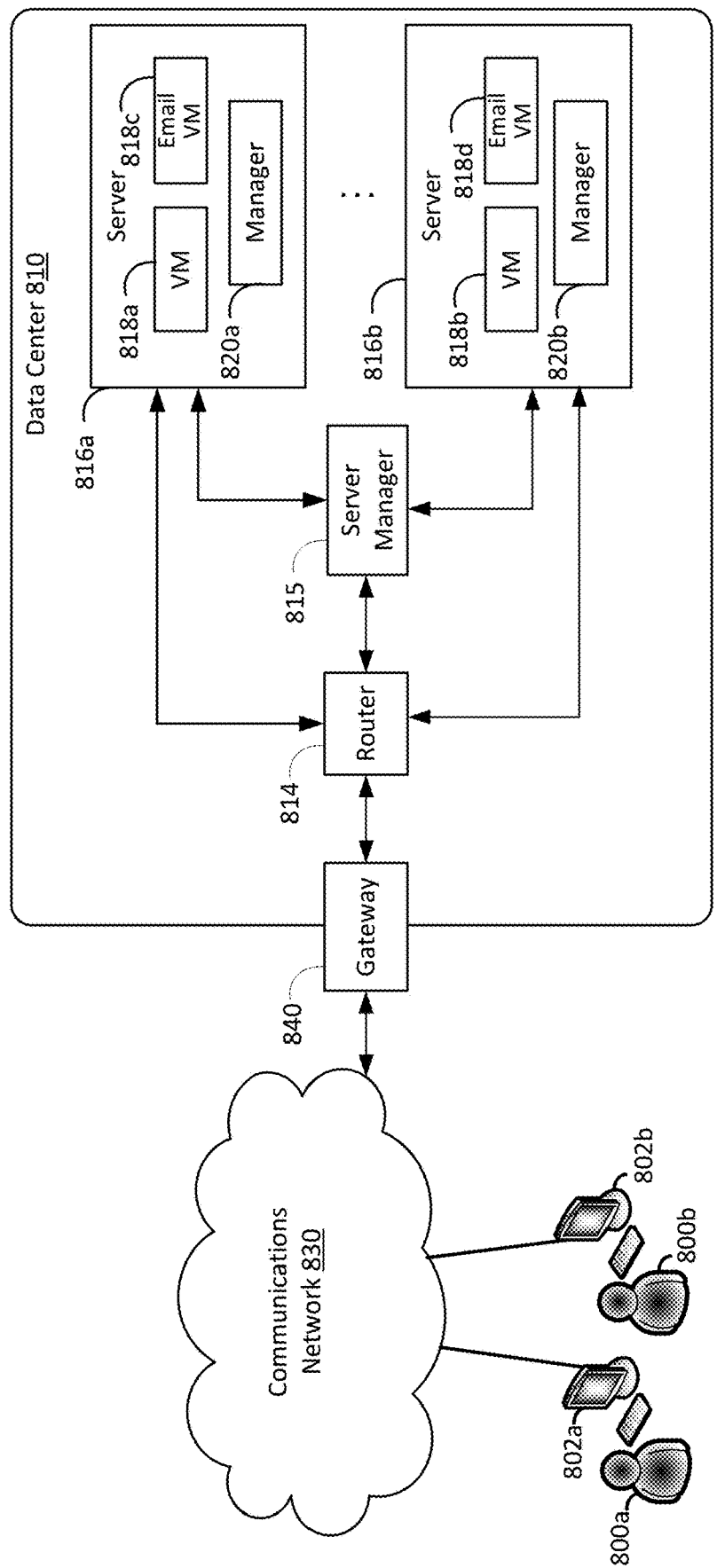
FIG. 8 is a diagram illustrating an example computing system that may be used in some embodiments.

As set forth above, a content provider may provide content to a destination over a network such as the Internet. Content may, in some cases, be provided upon request to a destination using, for example, streaming content delivery techniques. An example computing environment that enables providing of information to a destination will now be described in detail. In particular, FIG. 8 illustrates an example computing environment in which the embodiments described herein may be implemented. FIG. 8 is a diagram schematically illustrating an example of a data center 810 that can provide computing resources to users 800a and 800b (which may be referred herein singularly as user 800 or in the plural as users 800) via user computers 802a and 802b (which may be referred herein singularly as computer 802 or in the plural as computers 802) via a communications network 830. Data center 810 may be configured to provide computing resources for executing applications on a permanent or an as-needed basis. The computing resources provided by data center 810 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 810 may include servers 816a-b (which may be referred herein singularly as server 816 or in the plural as servers 816) that provide computing resources. These resources may be available as bare metal resources, or as virtual machine instances 818a-d and (which may be referred herein singularly as virtual machine instance 818 or in the plural as virtual machine instances 818). Virtual machine instances 818c and 818d are email service virtual machine instances. The email service virtual machine instances 218c and 218d may be configured to perform all or any portion of the email services in accordance with the present disclosure and described in detail herein. As should be appreciated, while the particular example illustrated in FIG. 8 includes one email service virtual machine in each server, this is merely an example. A server may include more than one email service virtual machine or may not include any email service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 8, communications network 830 may, for example, be a publicly accessible network of linked networks and possibly operated by various distinct parties, such as the Internet. In other embodiments, communications network 830 may be a private network, such as, a corporate or university network that is wholly or partially inaccessible to non-privileged users. In still other embodiments, communications network 830 may include one or more private networks with access to and/or from the Internet.

Communication network 830 may provide access to computers 802. User computers 802 may be computers utilized by users 800 or other customers of data center 810. For instance, user computer 802a or 802b may be a server, a desktop or laptop personal computer, a tablet computer, a wireless telephone, a personal digital assistant (PDA), an e-book reader, a game console, a set-top box or any other computing device capable of accessing data center 810. User computer 802a or 802b may connect directly to the Internet (e.g., via a cable modem or a Digital Subscriber Line (DSL)). Although only two user computers 802a and 802b are depicted, it should be appreciated that there may be multiple user computers.

User computers 802 may also be utilized to configure aspects of the computing resources provided by data center 810. In this regard, data center 810 might provide a gateway or web interface through which aspects of its operation may be configured through the use of a web browser application program executing on user computer 802. Alternately, a stand-alone application program executing on user computer 802 might access an application programming interface (API) exposed by data center 810 for performing the configuration operations. Other mechanisms for configuring the operation of various web services available at data center 810 might also be utilized.

Servers 816 shown in FIG. 8 may be standard servers configured appropriately for providing the computing resources described above and may provide computing resources for executing one or more web services and/or applications. In one embodiment, the computing resources may be virtual machine instances 818. In the example of virtual machine instances, each of the servers 816 may be configured to execute an instance manager 820a or 820b (which may be referred herein singularly as instance manager 820 or in the plural as instance managers 820) capable of executing the virtual machine instances 818. The instance managers 820 may be a virtual machine monitor (VMM) or another type of program configured to enable the execution of virtual machine instances 818 on server 816, for example. As discussed above, each of the virtual machine instances 818 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 810 shown in FIG. 8, a router 814 may be utilized to interconnect the servers 816a and 816b. Router 814 may also be connected to gateway 840, which is connected to communications network 830. Router 814 may be connected to one or more load balancers, and alone or in combination may manage communications within networks in data center 810, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 810 shown in FIG. 8, a server manager 815 is also employed to at least in part direct various communications to, from and/or between servers 816a and 816b. While FIG. 8 depicts router 814 positioned between gateway 840 and server manager 815, this is merely an exemplary configuration. In some cases, for example, server manager 815 may be positioned between gateway 840 and router 814. Server manager 815 may, in some cases, examine portions of incoming communications from user computers 802 to determine one or more appropriate servers 816 to receive and/or process the incoming communications. Server manager 815 may determine appropriate servers to receive and/or process the incoming communications based on factors such as an identity, location or other attributes associated with user computers 802, a nature of a task with which the communications are associated, a priority of a task with which the communications are associated, a duration of a task with which the communications are associated, a size and/or estimated resource usage of a task with which the communications are associated and many other factors. Server manager 815 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 810 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 9:
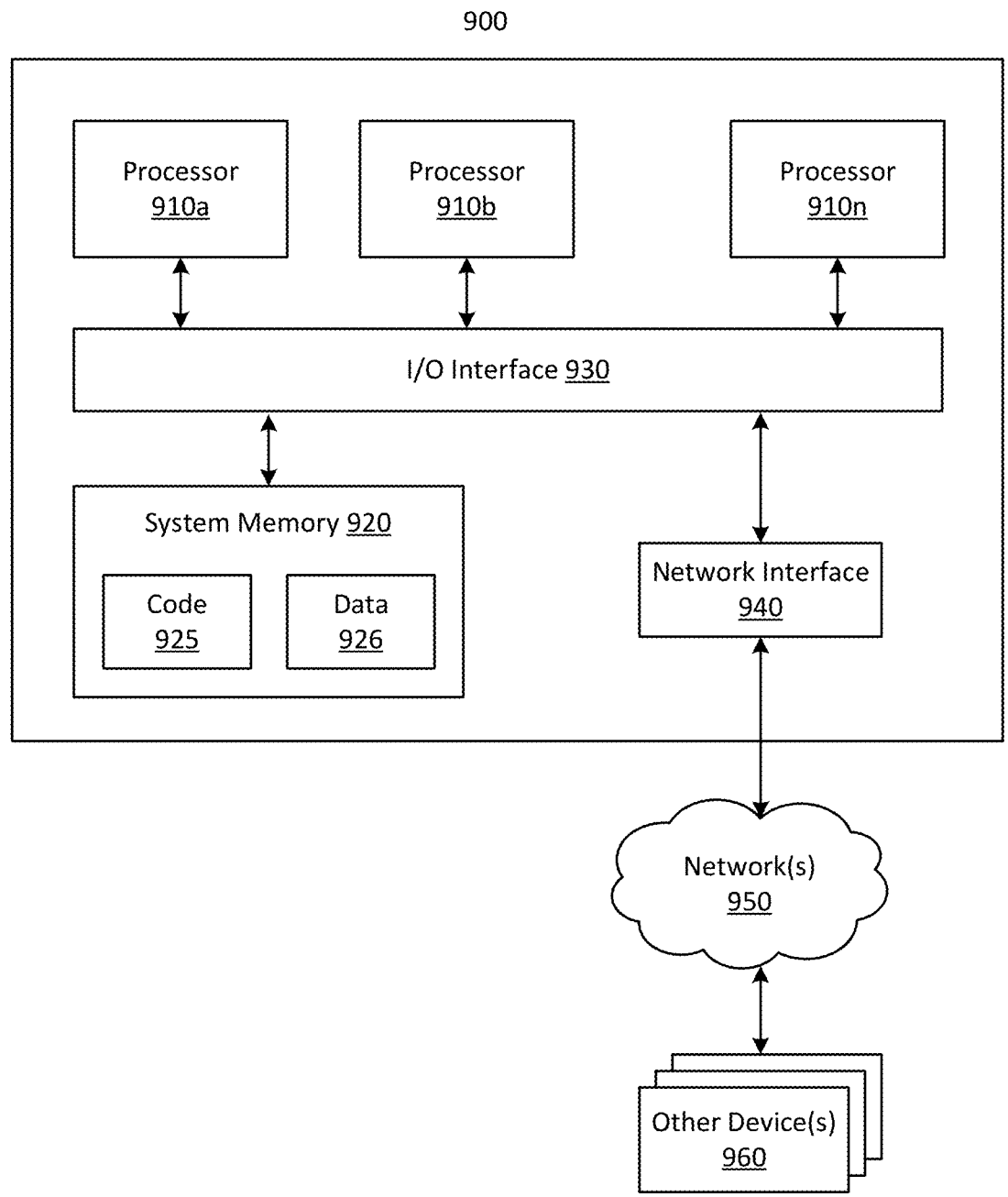
FIG. 9 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910*a*, 910*b* and/or 910*n* (which may be referred herein singularly as "a processor 910" or in the plural as "the processors 910") coupled to a system memory 920 via an input/output (I/O) interface 930. Computing device 9100 further includes a network interface 940 coupled to I/O interface 930.

In various embodiments, computing device 900 may be a uniprocessor system including one processor 910 or a multiprocessor system including several processors 910 (e.g., two, four, eight or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC or MIPS ISAs or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between processor 910, system memory 920 and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 90. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 900 as system memory 90 or another type of memory. Further, a computer-accessible medium may include transmission media or signals such as electrical, electromagnetic or digital signals conveyed via a communication medium such as a network and/or a wireless link, such as those that may be implemented via network interface 90. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method for providing an electronic mail application, the method comprising:
    storing data indicative of a plurality of electronic mail messages associated with an electronic mailbox account;
    receiving, via a user interface of the electronic mail application, search criteria to apply to the plurality of electronic mail messages;
    determining, based at least in part on the search criteria, search results comprising one or more of the plurality of electronic mail messages;
    generating, based at least in part on information in the search results, a plurality of organizing criteria for organizing the search results, wherein the plurality of organizing criteria comprise a plurality of different types of information automatically identified based on analyzing the information in the search results, wherein the plurality of different types of information comprise one or more of keywords, patterns, trends, or people;
    outputting, via the electronic mail application, the search results and an indication of the plurality of organizing criteria, wherein the search results are represented as items associated with a mailbox view of a plurality of user-selectable mailbox views, and wherein the plurality of organizing criteria are represented as selectable criteria for updating the search results; and
    updating, based at least in part on receiving a selection of at least one of the plurality of organizing criteria, the mailbox view to display updated search results.

2. The method of claim 1, further comprising storing data indicative of an additional mailbox view of the plurality of user-selected mailbox views for later access, wherein the data indicative of the additional mailbox view comprises an identifier of the additional mailbox view, the search criteria, and the at least one of the plurality of organizing criteria.

3. The method of claim 1, wherein generating, based at least in part on the information in the search results, the plurality of organizing criteria for organizing the search results comprises:
    determining one or more keywords in search results;
    determining a first frequency of the one or more keywords in a first portion of the search results associated with a first time period;

determining a second frequency of the one or more keywords in a second portion of the search results associated with a second time period; and determining the plurality of organizing criteria by ranking the one or more keywords based on the first frequency and second frequency.

4. The method of claim 1, wherein generating, based on information in the search results, the plurality of organizing criteria for organizing the search results comprises counting one or more of names identified in search results, keywords in the search results, or values of data fields in the search results.

5. The method of claim 1, further comprising outputting a visual element associated with a first organizing criterion of the plurality of organizing criteria, wherein the visual element indicates additional information about a set of electronic mail messages matching the first organizing criterion.

6. A system for providing an electronic mail application, the system comprising one or more memories having instructions thereon that, upon execution, at least cause the system to:

output, via a user interface of the electronic mail application, an interface element configured to allow a user to select a mailbox view from a plurality of stored mailbox views, wherein the mailbox view is associated with one or more search criteria and an identifier of the mailbox view;

receive data indicative of selection of the mailbox view;

determine, based on receiving the data indicative of the selection of the mailbox view, search results based on the one or more search criteria associated with the mailbox view;

generate, based on analyzing the search results, a plurality of organizing criteria for organizing the search results, wherein the plurality of organizing criteria comprise a plurality of different types of information automatically identified based on the analyzing of the search results, wherein the plurality of different types of information comprise one or more of keywords, patterns, trends, or people; and update the user interface to indicate the search results and the plurality of organizing criteria.

7. The system of claim 6, wherein the system is configured to generate the plurality of organizing criteria for organizing the search results by one or more of determining a frequency of keywords in the search results or determining a frequency of keywords in electronic mail messages not included in the search results.

8. The system of claim 6, wherein the plurality of organizing criteria comprise one or more of search criteria, filtering criteria, a name in the search results, or a keyword in the search results.

9. The system of claim 6, wherein the system is configured to generate the plurality of organizing criteria for organizing the search results by counting one or more of names identified in search results, keywords in the search results, or values of data fields in the search results.

10. The system of claim 6, wherein the system is configured to cause the user interface to output a visual element associated with a first organizing criterion of the plurality of organizing criteria, wherein the visual element indicates additional information about a set of electronic mail messages matching the first organizing criterion.

11. The system of claim 6, wherein the system is configured to receive data indicative of a selection of one of the plurality of organizing criteria and update the user interface to reflect applying the selected one of the organizing criteria to the search results.

12. The system of claim 6, wherein the mailbox view is dynamically updated based on changes associated with one or more of a user account or a receipt of a new electronic mail message.

13. The system of claim 6, wherein the system is further configured to:

access an information stream comprising a plurality of events associated with a user account;

determine a pattern based on one or more of the plurality of events;

determine, based on the pattern, an additional organizing criterion, and output the additional organizing criterion with the mailbox view.

14. The system of claim 6, wherein the system is further configured to send to the user interface the plurality of organizing criteria as metadata associated with the search results.

15. A non-transitory computer-readable storage medium having stored thereon computer-readable instructions, the computer-readable instructions comprising instructions that, upon execution on one or more computing devices, at least cause:

outputting, via a user interface of an electronic mail application, an interface element configured to allow a user to select a mailbox view from a plurality of stored mailbox views, wherein the mailbox view is associated with one or more search criteria and an identifier of the mailbox view;

receiving data indicative of selection of the mailbox view;

determining, based on receiving the data indicative of the selection of the mailbox view, search results based on the one or more search criteria associated with the mailbox view;

generating, based on analyzing the search results, a plurality of organizing criteria for organizing the search results, wherein the plurality of organizing criteria comprise a plurality of different types of information automatically identified based on the analyzing of the search results, wherein the plurality of different types of information comprise one or more of keywords, patterns, trends, or people; and updating the user interface to indicate the search results and the plurality of organizing criteria.

16. The computer-readable storage medium of claim 15, wherein generating the plurality of organizing criteria for organizing the search results comprises one or more of determining a frequency of keywords in the search results or determining a frequency of keywords in electronic mail messages not included in the search results.

17. The computer-readable storage medium of claim 15, wherein the plurality of organizing criteria comprise one or more of search criteria, filtering criteria, a name in the search results, or a keyword in the search results.

18. The computer-readable storage medium of claim 15, wherein generating the plurality of organizing criteria for organizing the search results comprises counting one or more of names identified in search results, keywords in the search results, or values of data fields in the search results.

19. The computer-readable storage medium of claim 15, wherein the instructions, upon execution on one or more computing devices, further cause storing data indicative of a plurality of conversation, wherein each conversation is associated with one or more of a plurality of electronic messages, and wherein outputting the search results comprises outputting the search results as one or more conversations of the plurality of conversations.

\* \* \* \* \*